Oct. 12, 1965  J. A. KOZMA, JR  3,211,546
METHOD OF LOADING A MELTING FURNACE
Filed March 4, 1963  3 Sheets-Sheet 1

INVENTOR
JOSEPH A. KOZMA JR.
BY
*Hauke & Hauke*
ATTORNEYS

Oct. 12, 1965    J. A. KOZMA, JR    3,211,546
METHOD OF LOADING A MELTING FURNACE
Filed March 4, 1963    3 Sheets-Sheet 2

INVENTOR
JOSEPH A. KOZMA JR.
BY
Hauke & Hauke
ATTORNEYS

Oct. 12, 1965   J. A. KOZMA, JR   3,211,546
METHOD OF LOADING A MELTING FURNACE
Filed March 4, 1963   3 Sheets-Sheet 3

INVENTOR.
JOSEPH A. KOZMA JR.
BY
ATTORNEYS

United States Patent Office 3,211,546
Patented Oct. 12, 1965

3,211,546
METHOD OF LOADING A MELTING FURNACE
Joseph A. Kozma, Jr., 2471 Wyoming Ave.,
Garden City, Mich.
Filed Mar. 4, 1963, Ser. No. 264,471
5 Claims. (Cl. 75—65)

The present application is a continuation-in-part of my copending application Ser. No. 18,164, filed March 28, 1960, now abandoned.

My invention relates to furnaces for melting preferably non-ferrous metals such as aluminum, and more particularly to an improved furnace construction utilizing radiant heating burners and in which oxidation and gas absorption is materially reduced through a new means of charging the furnace and holding a molten bath of metal.

With the accelerated requirement for aluminum die castings of thinner section, larger size, greater strength and ductility, and which may need to be welded, anodized, enameled or heat treated, greater emphasis is now being placed on metal quality.

The quality of a casting can be no better than the quality of the metal from which it is cast and therefore it is found to be necessary to look to the melting furnace for improving metal quality. The metal must be melted and held in a manner that will minimize oxide inclusions, hydrogen absorption, and temperature variation if metal quality is to be increased.

In melting furnaces using the more inexpensive gas heat about 14% water vapor is produced, and aluminum exposed to about 1600° to 1700° F. in the furnace has the ability to dissociate this water vapor due to its affinity for hydrogen at high temperatures, whereupon the oxygen oxidizes the metal surface rapidly and excessive quantities of hydrogen gas are absorbed. This results in high porosity and low quality cast products.

Furthermore, fluxing processes used to reduce oxides and gas bubbles take more time and consume excessive flux materials. High quality die cast products require as near perfect metal as possible in the dip-well of the furnace. Today such high quality is needed for many items required to be gas tight, having thin walls, and/or with good structural strength. Also, oxide inclusion is very undesirable in products which must be machined, since aluminum oxide is a hard abrasive. In addition, oxides and gas bubbles produce objectionable and non-uniform surface texture and appearance.

Heretofore, highest quality aluminum has been produced only in single batches, almost as in laboratory use. My invention makes possible continuous rapid production.

It has been discovered that the manner in which the cold bars of metal are fed to the furnace initially, and the manner in which the molten metal is held, affected the degree of this oxidation and gas absorption.

Heretofore, furnaces have been fed in various ways. The most simple way is to merely open a door and toss in a cold bar of metal. However, since every pound of aluminum requires about 500 B.t.u. for melting, all this heat must come from the bath, and the overall bath temperature will drop off each time a bar is introduced. Thus, the temperature of the aluminum used in casting will fluctuate, creating non-uniform quality, and also increasing scrap since if the temperature is not high enough, the mold will not fill completely before the metal taken from the furnace sets. Another disadvantage is that opening of a furnace door causes excessive air infiltration, increasing both oxidation probability and heat loss. Moreover, each time a fresh bar is fed, the protective surfaces of oxidized metal in the bath is disturbed, exposing fresh metal to the air as well as forcing oxidized metal into the purer sub-surface of the bath. The result is a high porosity low quality cast product. Further, splashing metal on the walls of the furnace decreases its life and makes for extra cleaning. Also, the corrosive action of oxides will ruin the burners.

Charging these furnaces through a flute in the conventional manner instead of through an open door does not solve most of these difficulties.

Some furnaces use what is called the "dry hearth" method of charging, in which the bar or scraps of cold metal are placed on a sloping shelf or ledge within the furnace but in a position spaced from the bath so that the metal is preheated and then as it melts it trickles into the bath. Furnaces utilizing this method of charging are shown in U.S. Patents Nos. 2,436,124 and 2,991,060 issued to W. F. Sklenar on Aug. 29, 1946, and July 4, 1961 respectively.

This type of charging produces a better quality of metal than is produced when cold ingots are fed directly into the furnace bath since there is less disturbance in the bath surface and less fluctuations in the bath temperature as the metal is fed into the furnace. However, as melting takes place on the dry hearth, clean non-oxidized metal is released from under the original protective oxide film enveloping the ingot. The newly released aluminum combines with the oxygen contained in infiltrated air and the water vapor generated as a product of fuel combustion to form aluminum oxide. Free hydrogen from the water vapor is absorbed by the molten metal which then flows into the bath laden with porosity producing hydrogen and oxide masses. The oxide formations increase the metal losses experienced in operating the furnace and since the oxides left from the original protective film coating the ingot are not pushed into the bath these build up and are virtually impossible to remove from the hearth unless the cleaning is performed after each successive charge. If left to accumulate on the hearth, the oxides very soon block off the port to the bath holding zone and cause a work stoppage.

The charging method of the present invention utilizes a new charging flue in combination with specially designed ingots. As will be more clearly described below the ingots are partially immersed in the metal bath and are prevented from total immersion until they have been heated by exhaust gases to approximately 70% of their melting point. After the ingot has reached this plastic state it deforms sufficiently to slide into the bath.

Several advantages of this method are immediately apparent. As there is virtually no change in the shape of the ingot during preheat, the only oxides that enter the bath are those contained in the oxide film formed prior to charging the ingot into the furnace. The fact that the oxide film is not disturbed reduces porosity in the finished product since it prevents the metal which it surrounds from absorbing hydrogen. Also, since a large percentage of the heat necessary to melt the ingot is absorbed prior to immersion, less heat is drawn from the bath itself to bring the ingot to a molten state and thus temperature fluctuation of the bath is substantially less than the fluctuations produced by cold ingot immersion.

The preheating of the ingot eliminates moisture on the metal surface and thus prevents hard spots often encountered in molten aluminum. The resulting low porosity makes possible pressure tight castings of thinner cross section than were heretofore possible.

It is an object then of the present invention to reduce oxidization and gas absorption in metal melting and holding furnaces by providing an improved method of charging such furnaces.

Another object of the invention is to improve charging methods by providing a new construction in which a cold bar is retained out of the bath of molten metal and in a position to absorb heat for a time sufficient to heat the bar to approximately 70% of its melting point and then released to slide as a whole into the bath.

It is another object of the present invention to provide an improved method of feeding metal to a heating and holding furnace by providing a bar of metal having a readily meltable leading edge portion and a furnace provided with a reception hopper having an angle bend dimensioned to provide an obstruction to the complete insertion of the bar and to release the bar only after the leading edge portion has melted.

It is still another object of the present invention to provide an improved method of continuously feeding metal to a heating and holding furnace by providing an angularly dimensioned reception hopper for the furnace and a plurality of metal bars being dimensioned to be retained in the reception hopper in a position one stacked over the other until the lower most bar has been heated to approximately 70% of its melting point at which time it will slide into the bath and the bars above it will move to the next lower position for additional preheating to the necessary entering temperature.

For a more complete understanding of the invention, reference may be had to the accompanying drawing illustrating preferred embodiments of the invention in which like reference characters refer to like parts throughout the several views and in which.

Figure 1:
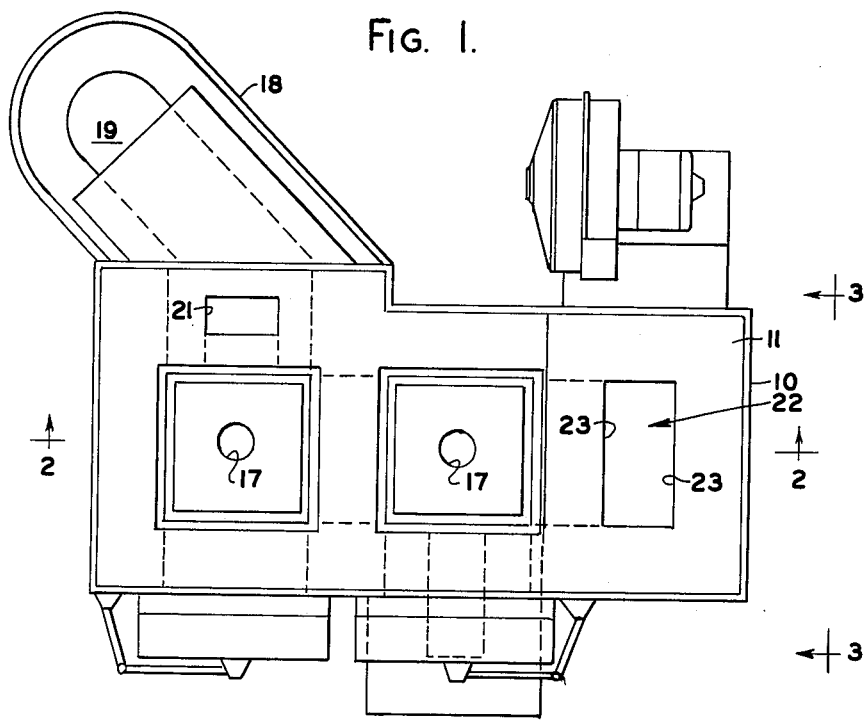
FIG. 1 is a plan view of a preferred portable furnace embodying the invention.

The presently illustrated furnace preferably comprises a metal casing 10 having a fire brick inner lining 11 constructed to provide a rectilinear chamber 12 divided into two portions by means of an interior wall 13 which has a lower opening 14 disposed below the surface of the molten metal bath 15.

Figure 2:
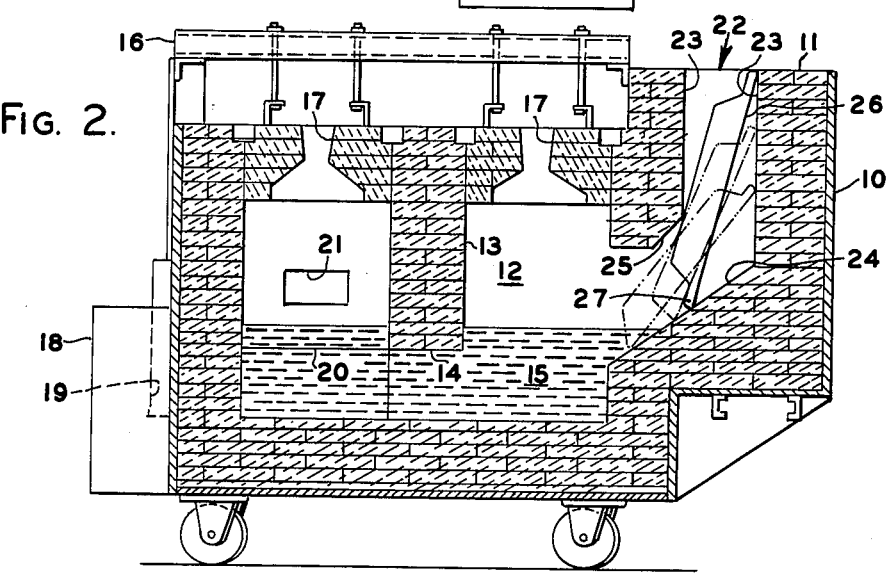
FIG. 2 is a cross-sectional view taken substantially on the line 2–2 of FIG. 1.
Figure 3:
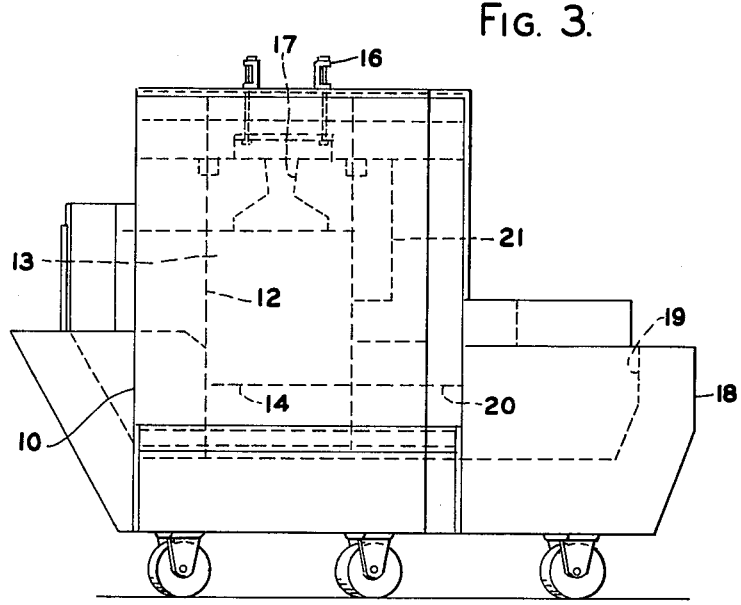
FIG. 3 is an end view of the furnace as seen from the line 3—3 of FIG. 1.

FIGS. 2 and 3 include a frame structure 16 adapted to retain gas burners (not shown) which are to be installed in top openings 17 for producing radiant heat in the furnace. Heating is directed to both portions of the chamber 12 as shown, and transferred between the portions by conduction and metal flow through the subsurface of the bath.

A dip-well structure 18 is an integral part of the furnace and has a dip-well 19 communicating through an opening 20 in the side wall of the furnace with one portion of the chamber 12, the top of the opening 20 being below the surface of the bath 12 to give only sub-surface metal flow from the bath 15 to the dip-well 19.

The other chamber portion is openly connected with a reception hopper 22. The reception hopper 22 preferably comprises vertically extending walls 23 and a bottom 24 extending at a substantially 135° angle from one of the walls 23 into the bottom of the chamber 12. The other wall 23 is provided with a corner 25 beveled at a substantially 135° angle as shown. A bar of metal 26 is provided with a thin leading edge portion 27. The bar of metal is suitably dimensioned and the walls 23 are suitably spaced so that when the bar 26 is first inserted it will wedge against wall 23 and the bottom 24 with the leading edge portion 27 preferably spaced slightly from the bath 15 as can be seen in FIG. 2.

In this way the bar 26 will be retained in the hopper 22 until the leading edge portion 27 is melted by the exhaust heat from the bath 15 at which time the shortened bar 26 will slide down the sloped bottom 24 and into the bath 15. The then leading edge portion 27 is sufficiently thick to retain the bar 26 in the wedged position until the bar 26 has been heated to approximately 70% of its melting point.

It is apparent that the dimensions of the hopper 22 and of the bar 26 must be sufficiently related to perform this function.

Since the bar of metal 26 is retained until it has been preheated to approximately 70% of its melting point, very little temperature fluctuation results in the bath when the bar 26 slides into the bath 15. Since it is released before much deformation has occurred, oxidation and gas absorption are kept at a minimum. This results in a high quality metal having a lower porosity than was heretofore possible.

Figure 4:
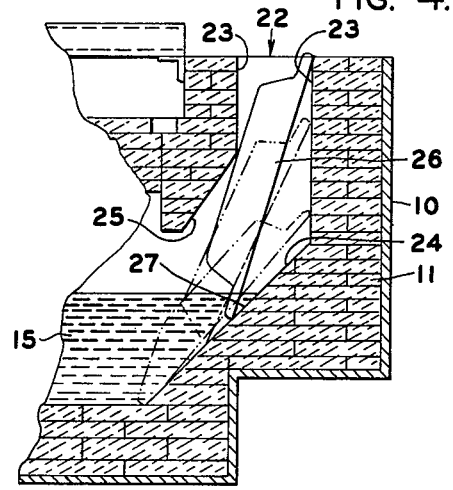
FIG. 4 is a fragmentary cross-sectional view of a modification of the present invention.

IN FIG. 4, a modification of the hopper 22 is illustrated as having a slightly steeper sloped bottom 24 and the bar 26 is dimensioned so that the leading edge portion 27 will be immersed in the bath 15. This construction acts to more rapidly melt the leading portion 27 and the bar 26 will slide more rapidly beneath the surface of the bath. The lesser pre-heat time thus provided is found in many cases to be preferred.

Figure 5:
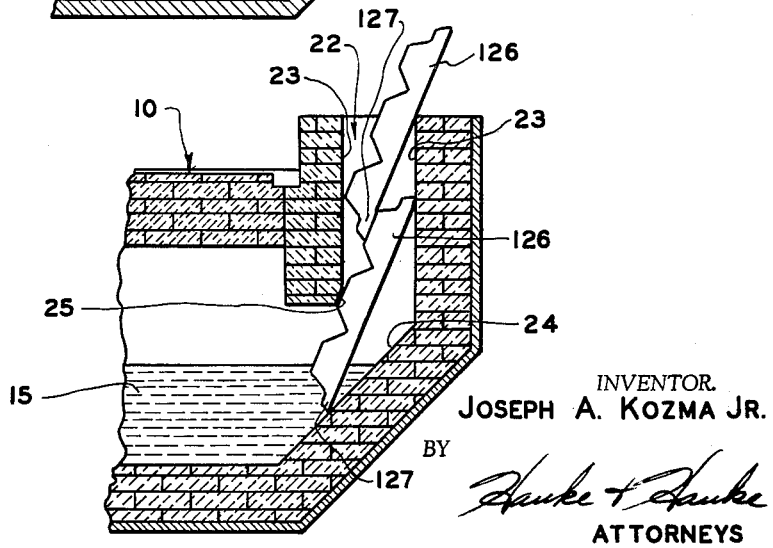
FIG. 5 is a fragmentary cross-sectional view of yet another modification of the present invention.

FIG. 5 illustrates another preferred method of charging the heating furnace 10 in which bars 126 are positioned in the reception hopper 22, one above the other, as shown. Each of the bars 126 is provided with a readily meltable leading edge 127 and is dimensioned in relation to the dimensions of the hopper 22 so that upon insertion, the lowermost bar 126 will wedge between the bottom 24 and the beveled corner 25 and the uppermost bar 126 will be wedged between the walls 23 of the reception hopper 22 and be supported by the lowermost bar 126. As the leading edge 127 of the lowermost bar 126 melts, the lowermost bar 126 will slide into the bath 15 and the uppermost bar 126 will move to the position formerly occupied by the lowermost bar 126. In this way a greater amount of the exhaust heat is utilized since heat which would ordinarily escape is utilized to partially preheat the uppermost bar 126. Again, the leading edge 127 is suitable dimensioned to retain the bar 126 in the hopper 22 until the bar 126 has been heated to approximately 70% of its melting point. This method also greatly speeds feeding rates and hence increases the potential rate of removal of usable molten metal.

It is apparent that a combination of elements has been disclosed which provides a new method of charging a melting furnace. The particularly disclosed bar of metal 26–126 forms an important part in this combination since this bar 26–126 coacts with the restricted hopper 22 to produce the delay in permitting the bar to slide into the bath 15 which is required to preheat the bar 26–126 to the desired temperature.

Figure 6:
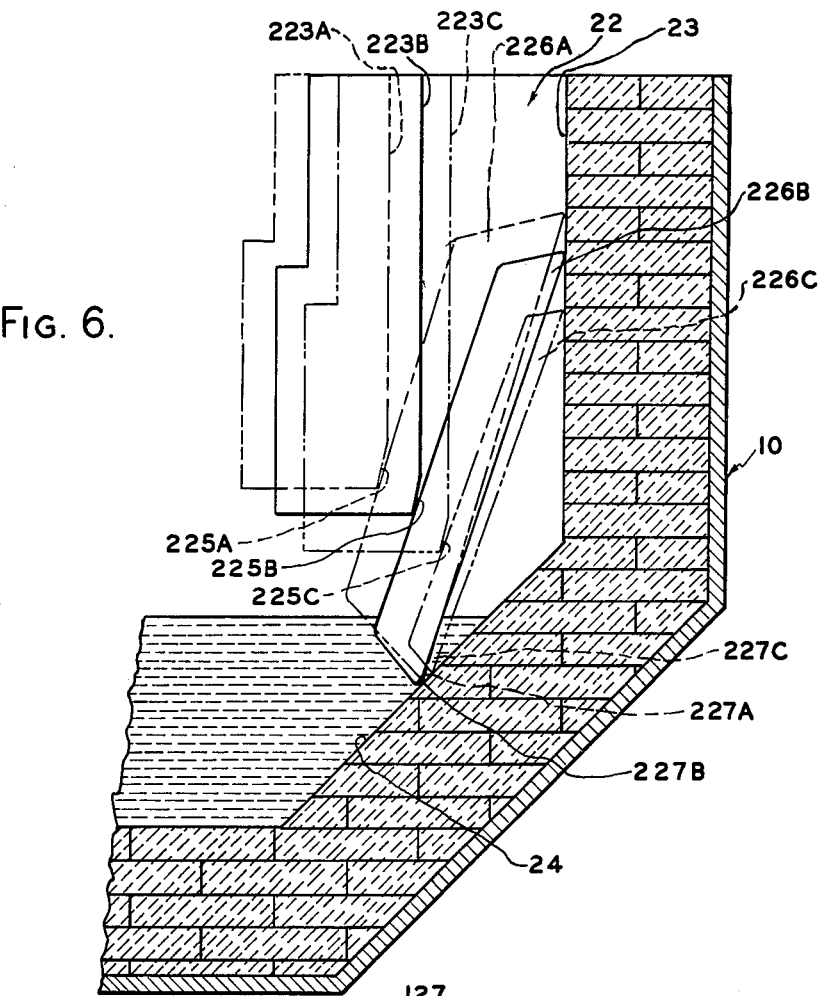
FIG. 6 is a diagrammatic view illustrating the use of different size bars of metal.

FIG. 6 illustrates diagrammatically the dimensioning of the hopper 22 which is necessary to provide the disclosed method of charging with different size bars 226a, 226b, and 226c. Here the bars 226a, b, c are illustrated with a readily meltable leading corner 227a, 227b, and 227c respectively rather than the leading edge heretofore described but the corners 227a, 227b, and 227c will produce the same result and retain the bars 226a, 226b, 226c until the approximately 70% of the melting point has been produced.

The bar 226a is 6" x 30" and to accommodate this size bar the wall 223a is spaced 11 inches from the wall 23. It is to be noted that in this embodiment it has been preferred to construct corners 225a, 225b, 225c of a slightly greater angle than the bottom portion 24 so that the bars 225a, 225b, and 225c are wedged between the lower portion of the corners 225a, 225b, and 225c and the bottom 24 rather than the upper portion as heretofore illustrated.

The bar 225b is 3½" x 28" and the wall 223b is positioned approximately 9 inches from the wall 23 to accommodate this bar. The bar 225c is 2" x 24" and the wall 223c is positioned approximately 7½" from the wall 23 to accommodate this bar.

It is also apparent that although we have described but three preferred modifications of the invention, it will be apparent to one skilled in the art to which the invention pertains that various changes and modifications may be made therein without departing from the spirit of the invention or the scope of the appended claims.

I claim:

1. A method of loading the melting chamber of a melting furnace comprising
    (a) providing said melting furnace with a receiving portion disposed above the level of molten metal in said melting chamber and in communication with said melting chamber,
    (b) providing said receiving portion with a stationary obstruction disposed above the level of molten metal in said melting chamber,
    (c) providing a predetermined size bar of metal having a readily meltable leading edge portion,
    (d) dimensioning said bar, said leading edge portion, and said receiving portion obstruction to prevent said bar from falling into said chamber only as long as said leading edge portion remains intact,
    (e) inserting said bar in said receiving portion,
    (f) heating said bar at a time and temperature sufficient to melt said leading edge portion whereby said bar will clear said obstruction and fall by gravity into the bottom of said melting chamber, and
    (g) dimensioning said leading edge portion so that the same will melt when the average temperature of the remainder of the bar has reached approximately 70% of its melting point.

2. A method of loading the melting chamber of a melting furnace comprising
    (a) providing said melting furnace with a receiving portion disposed above the level of molten metal in said melting chamber and in communication with said melting chamber,
    (b) providing said receiving portion with a stationary obstruction disposed above the level of molten metal in said melting chamber,
    (c) forming a bar of metal with a readily meltable leading edge portion,
    (d) dimensioning said bar, said leading edge portion, and said obstruction to cause said bar to be retained in said receiving portion by said obstruction only until said leading edge portion is melted,
    (e) inserting said bar into said receiving portion,
    (f) heating said bar at a time and temperature sufficient to melt said leading edge portion whereby said bar will thereafter automatically fall into the melting chamber of said furnace,
    (g) dimensioning said leading edge portion so that the same will melt and said bar will fall into said melting chamber when the average temperature of the remainder of the bar has reached approximately 70% of its melting point.

3. A method of loading a melting furnace having a chamber for holding a bath of molten metal, said method comprising,
    (a) providing said melting furnace with a receiving portion disposed above the level of molten metal in said melting chamber and in communication with said melting chamber,
    (b) providing said receiving portion with a stationary obstruction disposed above the level of molten metal in said melting chamber,
    (c) forming a bar of metal with a readily meltable leading edge portion,
    (d) dimensioning said bar, said leading edge portion, and said obstruction to cause said bar to be retained in said receiving portion by said obstruction only until said leading edge portion has melted,
    (e) inserting said bar in said receiving portion with said leading edge portion immersed in said bath,
    (f) heating said bath at a time and temperature sufficient to melt said leading edge portion of said bar whereby said bar will clear said obstruction and fall by gravity into the bottom of said melting chamber,
    (g) dimensioning said leading edge portion so that the same will melt and said bar will fall into said melting chamber when the average temperature of the remainder of the bar has reached approximately 70% of its melting point.

4. A method of loading a melting furnace having a chamber for holding a bath of molten metal, said method comprising
    (a) providing said melting furnace with a receiving portion disposed above the level of molten metal in said melting chamber and in communication with said melting chamber,
    (b) forming said receiving portion with a pair of vertically extending walls and an obstruction formed by a wall extending angularly from one of said vertically extending walls towards said melting chamber,
    (c) providing a predetermined size bar of metal having a readily meltable leading edge portion,
    (d) dimensioning said bar and said leading edge portion to be wedged in said receiving portion by said angularly extending wall only as long as said leading edge portion remains intact,
    (e) inserting said bar into said receiving portion,
    (f) heating said bar at a time and temperature sufficient to melt the leading edge portion whereby said bar will slide along said angularly extending wall into the bottom of said melting furnace,
    (g) dimensioning said leading edge portion so that the same will melt and said bar will fall into said melting chamber when the average temperature of the remainder of the bar has reached approximately 70% of its melting point.

5. A method of loading the melting chamber of a melting furnace comprising
    (a) providing said melting furnace with a receiving portion disposed above the level of molten metal in said melting chamber and in communication with said melting chamber,
    (b) providing said receiving portion with a stationary obstruction disposed above the level of molten metal in said melting chamber,
    (c) providing a predetermined size bar of metal having a readily meltable leading edge portion,
    (d) dimensioning said bar, said leading edge portion and said receiving portion obstruction to prevent said bar from falling into said chamber only as long as said leading edge portion remains intact,
    (e) inserting said bar in said receiving portion,
    (f) heating said bar at a time and temperature sufficient to melt said leading edge portion whereby said bar will clear said obstruction and fall by gravity into the bottom of said melting chamber,
    (g) dimensioning said leading edge portion so that the same will melt and said bar will fall into said melting chamber when the average temperature of the remainder of the bar has reached a predetermined percentage of its melting point,
    (h) forming a second bar of material with a readily meltable leading edge portion and dimensioning said second bar to be retained in said obstruction only until said leading edge has melted, and
    (i) inserting said second bar in said receiving portion engageably overlying and supported by said first bar whereby as said first bar falls into said furnace said second bar will drop into a position retained by said obstruction until the leading edge of said second bar has melted.

References Cited by the Examiner
UNITED STATES PATENTS

| | | | |
|---|---|---|---|
| 2,204,173 | 6/40 | Bowser | 266—33 |
| 2,264,740 | 12/41 | Brown | 266—33 |
| 2,446,637 | 8/48 | Crampton et al. | 75—65 |
| 2,597,269 | 5/52 | Tama | 75—65 |
| 2,873,102 | 2/59 | Tripmacher et al. | 75—65 |
| 2,991,060 | 7/61 | Sklenor | 263—11 |
| 3,085,124 | 4/63 | Upton | 75—65 |

BENJAMIN HENKIN, *Primary Examiner.*

MORRIS O. WOLK, DAVID L. RECK, *Examiners.*